United States Patent
Stratton et al.

(10) Patent No.: US 7,813,286 B2
(45) Date of Patent: *Oct. 12, 2010

(54) METHOD AND SYSTEM OF DISTRIBUTING MULTICAST GROUP JOIN REQUEST IN COMPUTER SYSTEMS OPERATING WITH TEAMED COMMUNICATION PORTS

(75) Inventors: Mark C. Stratton, Austin, TX (US); Michael Sean McGee, Austin, TX (US); Matthew S Reeves, Austin, TX (US); Darda M. Chang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

This patent is subject to a terminal disclaimer.

(21) Appl. No.: 11/468,499

(22) Filed: Aug. 30, 2006

(65) Prior Publication Data

US 2008/0056164 A1     Mar. 6, 2008

(51) Int. Cl.
H04L 12/26     (2006.01)
(52) U.S. Cl. ..................................................... 370/238
(58) Field of Classification Search ......... 370/216–218, 370/225, 229–235, 230.1, 235.5, 237–238, 370/238.1, 254–256, 259–260, 270, 359, 370/390, 395.2, 395.32, 395.4, 395.41, 395.42, 370/395.43, 395.5, 395.53, 401, 409, 419, 370/432, 437, 468, 473
See application file for complete search history.

(56) References Cited

U.S. PATENT DOCUMENTS

| 6,493,318 | B1 | 12/2002 | Bare |
| 6,535,491 | B2 | 3/2003 | Gai et al. |
| 6,560,630 | B1 | 5/2003 | Vepa et al. |
| 6,963,576 | B1 * | 11/2005 | Lee ............................ 370/411 |
| 7,072,293 | B2 * | 7/2006 | Hunter et al. ................ 370/218 |
| 7,143,196 | B2 * | 11/2006 | Rimmer et al. ............. 709/249 |

(Continued)

OTHER PUBLICATIONS

Cisco Systems, Inc., "Software Configuration Guide-Catalyst 4000 Family, Catalyst 2948G, Catalyst 2980G, Release 7.2," Copyright 2000-2002, Cisco Systems, Inc.

(Continued)

*Primary Examiner*—Chirag G Shah
*Assistant Examiner*—Amarnauth Persaud

(57) ABSTRACT

A method and system of distributing multicast group join requests in computer systems operating with teamed communication ports. At least some of the illustrative embodiments are computer-readable media storing a program that, when executed by a processor, causes the processor to intercept multicast group join requests sent from a network layer program executed by the processor, and distribute the multicast join requests across a plurality of communication ports operating as a single virtual port.

10 Claims, 5 Drawing Sheets

U.S. PATENT DOCUMENTS

| | | | |
|---|---|---|---|
| 2003/0097415 A1* | 5/2003 | Laux et al. | 709/206 |
| 2003/0179707 A1* | 9/2003 | Bare | 370/235 |
| 2005/0270980 A1 | 12/2005 | McGee | |
| 2006/0013224 A1 | 1/2006 | Chiba | |
| 2006/0029097 A1 | 2/2006 | McGee et al. | |
| 2006/0034190 A1 | 2/2006 | McGee et al. | |
| 2006/0209787 A1* | 9/2006 | Okuda | 370/351 |
| 2006/0223534 A1* | 10/2006 | Newberg et al. | 455/436 |
| 2006/0251106 A1* | 11/2006 | Nakagawa et al. | 370/456 |
| 2007/0177594 A1* | 8/2007 | Kompella | 370/390 |
| 2007/0201490 A1 | 8/2007 | Mahamuni | |
| 2007/0233810 A1* | 10/2007 | Brownell et al. | 709/218 |
| 2008/0056120 A1* | 3/2008 | Jha et al. | 370/216 |
| 2008/0151807 A1* | 6/2008 | Meier et al. | 370/312 |
| 2009/0135821 A1* | 5/2009 | Kobayashi | 370/390 |

OTHER PUBLICATIONS

McGee et al., Office Action dated Dec. 31, 2008, U.S. Appl. No. 11/468,615, filed Aug. 30, 2006.

McGee et al., Office Action dated Jul. 24, 2009, U.S. Appl. No. 11/468,615, filed Aug. 30, 2006.

* cited by examiner

METHOD AND SYSTEM OF DISTRIBUTING MULTICAST GROUP JOIN REQUEST IN COMPUTER SYSTEMS OPERATING WITH TEAMED COMMUNICATION PORTS

BACKGROUND

In order to implement communication fault tolerance, and in some cases increase data throughput, a computer system may couple to a network by way of a plurality of communication ports (hereinafter just ports), with the ports either implemented on a single network interface card (NIC) or the ports implemented on multiple NICs. The ports are "teamed" such that, regardless of the actual number of ports, the ports appear as a single communication port to application level programs in the computer system.

Various application level programs may wish to join multicast groups and thus receive multicast data flows from that group. Multicast data flows are streams of data from streaming sources such as streaming audio, streaming video, and streaming financial market data. The streaming source generates the streaming data, and provides the streaming data to an internet protocol (layer 3) router. If no downstream device has requested the streaming data, the stream "dies" at the router. If a downstream device wishes to receive the streaming data, the downstream device issues a join request, and the router then forwards the streaming data to the local area network (LAN) and/or sub-network on which the downstream device resides.

Multicast data flow is similar to broadcast traffic in that, without switch and/or router intervention, every computer system on the LAN or subnet to which the multicast data flow is forwarded receives the multicast data flow. Some switch devices (in particular layer 2 devices such as Ethernet switches) implement join request snooping, and configure ports dynamically so that the switch devices only forward multicast data flow to ports from which join requests originate for each IP multicast group. In the case of teamed communication ports, and with respect to multicast group join requests, those requests issue only from the primary communication port. Since the primary communication port is coupled to a specific switch port, the join request only affects the primary communication port's reception of multicast traffic. This forces all multicast data flow into the primary communication port.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
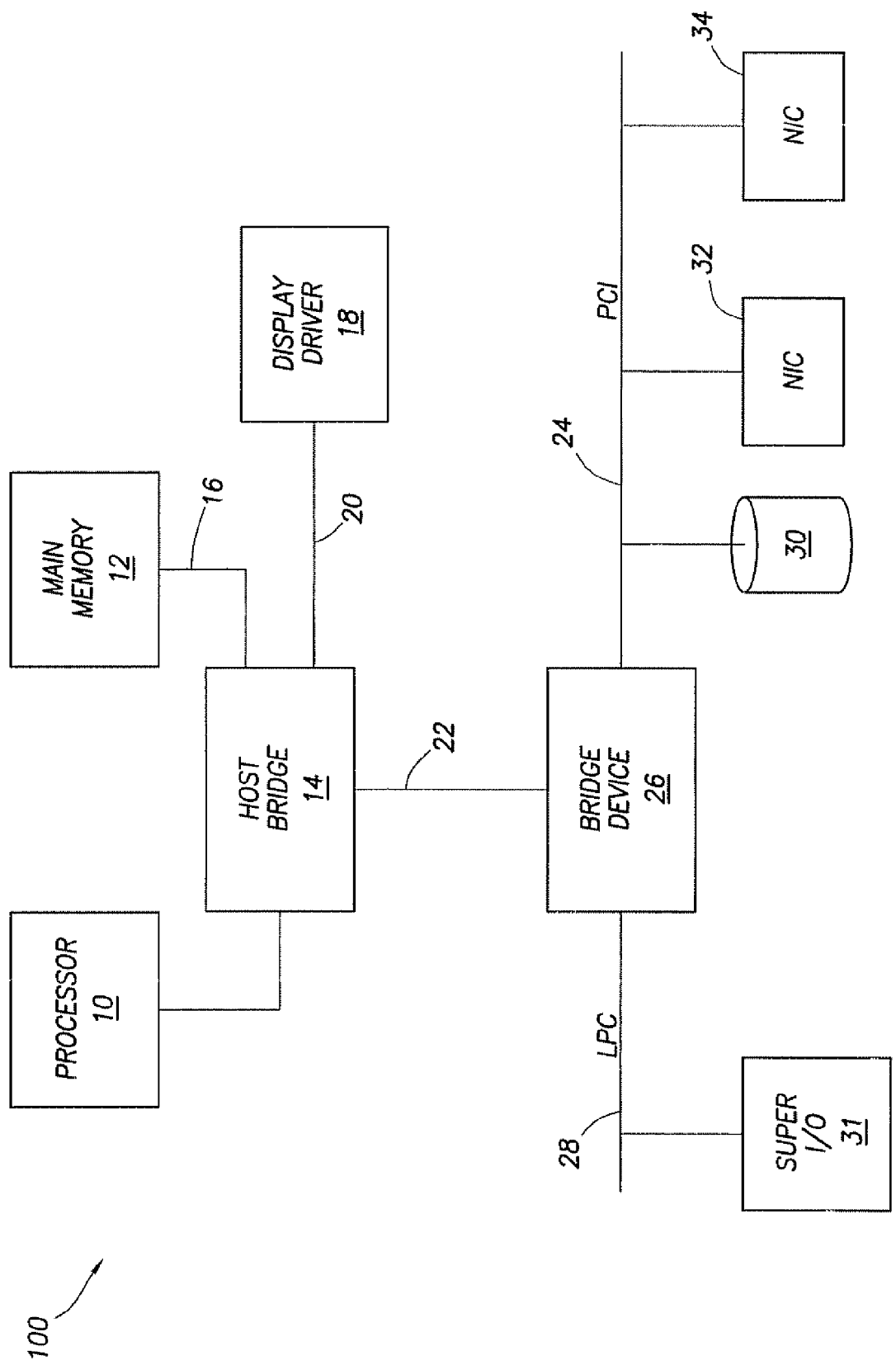
FIG. 1 illustrates a computer system in accordance with at least some embodiments.

FIG. 1 illustrates a computer system 100 in accordance with at least some embodiments. In particular, computer system 100 comprises at least one processor 10. In alternative embodiments the computer system 100 comprises multiple processors arranged in a configuration where parallel computing may take place. The processor 10 couples to a main memory array 12, and a variety of other peripheral computer system components, through a host bridge logic 14, although in some embodiments the host bridge logic 14 may be integrated with the processor 10. The main memory array 12 couples to the host bridge logic 14 through a memory bus 16. The host bridge logic 14 controls transactions to the main memory 12 by asserting control signals during memory accesses. The main memory 12 functions as the working memory for the processor 10 and comprises a memory device or array of memory devices in which program instructions and data are stored. The main memory array 12 may comprise any suitable type of memory, such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In some embodiments, text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses (i.e., the peripheral component interconnect (PCI) bus 24). The display device to which the display driver device 18 couples may comprise any suitable electronic display device upon which any image or text can be represented. In embodiments where the computer system 100 is a server system (e.g., in rack mounted enclosure with a plurality of other server systems), the display driver 18 may be omitted.

Computer system 100 also comprises a second bridge logic device 26 that bridges the primary expansion bus 22 to various secondary buses, such as a low pin count (LPC) bus 28, the PCI bus 24, and a Universal Serial Bus (USB). These secondary expansion buses are only illustrative, and other secondary expansion buses and bus protocols now in existence, or after-developed, may be equivalently used. In some embodiments, the bridge logic device 26 is an Input/Output (I/O) Controller Hub (ICH) manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 31 couples to the second bridge logic device 26 and controls many system functions. The Super I/O controller 31 may interface, for example, with a system pointing device, such as a mouse, a keyboard, and various serial ports and floppy drives. The Super I/O controller is referred to as "super" because of the many I/O functions it may perform. Because in some embodiments the computer system 100 is a server, the server may not have a dedicated mouse and keyboard.

Still referring to FIG. 1, the computer system 100 may further comprise a long term data storage device, such as disk drive system 30 coupled to the bridge logic device 26 by way of the illustrative PCI bus 24. The disk drive system 30 may be a single drive, or an array of drives operated as a redundant array of independent (or inexpensive) disks (RAID) system. While the illustrative disk drive system 30 is shown as coupled to the PCI bus 24, the disk drive system may equivalently couple to other buses, such as the primary expansion bus 22 or other secondary expansion buses.

The computer system 100 further comprises a plurality of network interface cards (NICs) or other form of network adapters. In the illustrative case of FIG. 1, the computer system 100 comprises NICs 32 and 34. The NICs 32 and 34 are message interfaces between the computer system 100 and one or more communication networks, such as an Ethernet network implementing a local area network (LAN) or wide area network (WAN). While FIG. 1 illustrates both NICs 32 and 34 coupled to the same PCI bus 24, in alternative embodiments the NICs may couple to different PCI buses, or buses having different communication protocols (e.g., one NIC coupled to the PCI bus, and a second NIC coupled to the primary expansion bus 22) to implement bus fault tolerance. Each NIC 32 and 34 implements at least one communication port, and each NIC may implement multiple communication ports. For example, a NIC may implement four or eight communication ports, and thus a NIC may implement four or eight separately controllable interfaces to four or eight different communication networks.

In accordance with some embodiments, two or more communication ports (hereinafter just "ports") may be grouped or teamed for purposes of fault tolerance and/or to increase communication throughput. Teamed ports may be implemented on the same NIC device, or the ports may span multiple NIC devices. Moreover computer system 100 may implement multiple teams. Teamed ports represent redundant links to the communication network, and in some cases each port may communicate over distinct paths or segments of the network that ultimately couple to a core switch.

If employed in a packet-switched network, each of the NICs 32 and 34 of FIG. 1 transmit to and receive from the network packets (e.g., Ethernet® formatted packets) generated by clients on the network. The formatting of the packets is defined by the implemented transmission protocol. Each device on a network uses one or more unique addresses by which it communicates with the other devices on the network, with each address (corresponding to one of the layers of the OSI model) embedded in the packets for both the source device and the destination device. A device uses an address at layer 2 (the data link layer) known as a media access control (MAC) address and an address at layer 3 (the network layer) known as a protocol address (e.g., Internet Protocol (IP), IP eXchange (IPX), AppleTalk). The MAC address can be thought of as being assigned to the physical hardware of the device, such as the NIC, whereas the protocol address is assigned to the software of the device. When multiple protocols reside on the same network device, a protocol address is usually assigned to each resident protocol.

For Ethernet networks, devices on the same broadcast domain or subnet communicate directly using their respective layer 2 MAC addresses, even though the software for each device initiates communication with one or more other network devices using their protocol addresses. Ethernet devices first ascertain the MAC address corresponding to a particular protocol address of a destination device. For the IP protocol, this is accomplished by first consulting a cache of MAC address/protocol address pairs maintained by each network device. If an entry for a particular protocol address is not present, a process is initiated whereby the sending device broadcasts a request to all devices on the network requesting that the device having the destination protocol address reply with its MAC address. This is known as address resolution protocol (ARP) request, the result of which is then stored in the cache. Communication packets are formed by embedding the source and destination MAC addresses (48 bits each), as well as embedding the source and destination protocol addresses, in the payload of the packet. The source protocol address indicates to the receiving device the identity of the source device from which the packet was received and thus to which device to respond if a response is required. For the IPX protocol, the ARP process is not needed as the MAC address is a constituent of the IPX address.

Figure 2:
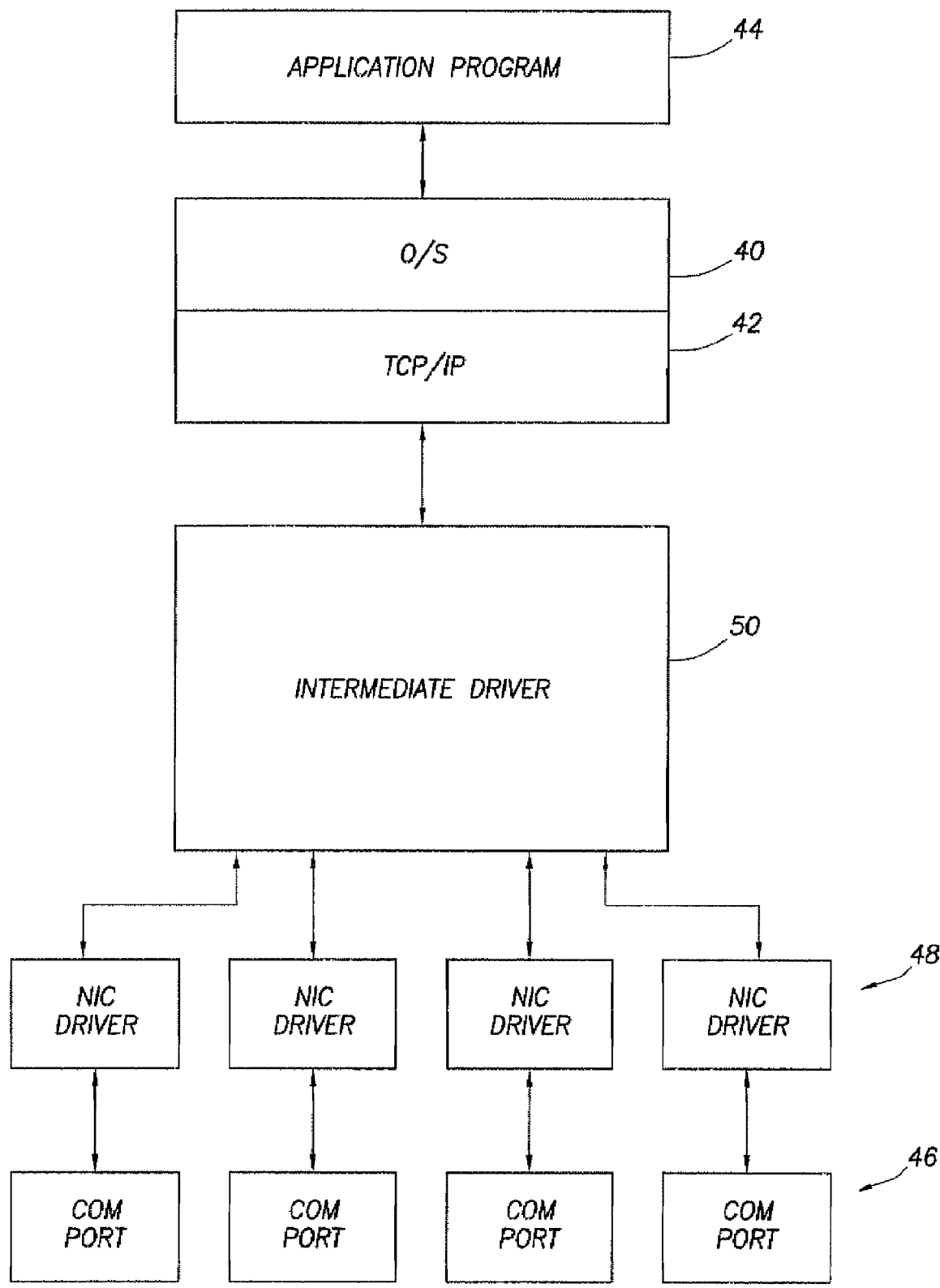
FIG. 2 illustrates the relationship of various software programs and/or drivers in accordance with embodiments.

FIG. 2 illustrates the relationship of various pieces of software executed by the processor 10 to implement teaming in accordance with some embodiments. In particular, the computer system implements an operation system (O/S) 40 that supports networking. Any currently available or after developed operating system that supports networking may be used. In the illustrative case of FIG. 2, the operating system 40 supports a transmission control protocol/internet protocol (TCP/IP) stack 42, but other communication protocols may be implemented simultaneously or in the alternative (e.g., IPx, NetBUEI). The operating system 40, and in particular the illustrative TCP/IP protocol stack 42, enable one or more application programs 44 to communicate to other computer systems over a network.

Still referring to FIG. 2, each port 46 has associated therewith a NIC driver 48 (where each NIC driver may be alternatively referred to as a miniport driver). In cases where each NIC (e.g., NICs 32 and 34 of FIG. 1) are made by the same vendor and have the same capabilities, the NIC drivers 48 may be duplicate programs. However, the NICs need not be made by the same vendor or have the same capabilities. For example, one NIC may implement 100 megabit per second (Mbps) data throughput, while another NIC may implement 1000 Mbps (Gigabit) throughput, and in these alternative embodiments the NIC drivers may be vendor and/or capability specific. In spite of having different vendors and/or different capabilities, the various NICs, or their ports, may still be teamed in accordance with embodiments of the invention.

In situations where each port 46 operates independently or in a non-teamed manner, the illustrative TCP/IP stack 42 communicates directly with each NIC driver 48; however, in accordance with embodiments of the invention the ports 46 are teamed such that they appear as a single communication port to the illustrative TCP/IP stack 42 and application program 44. To enable teaming, an intermediate driver 50 interfaces between the illustrative TCP/IP stack 42 and the various drivers 48. More particularly, the intermediate driver 50 communicates with the illustrative TCP/IP stack 42, and appears to the TCP/IP stack as a single NIC driver. Likewise, the intermediate driver 50 appears as a TCP/IP stack to each of the NIC drivers 48. Operation of the intermediate driver 50 to implement multicast group receive load balancing is introduced after a brief discussion of multicast traffic flow.

Figure 3:
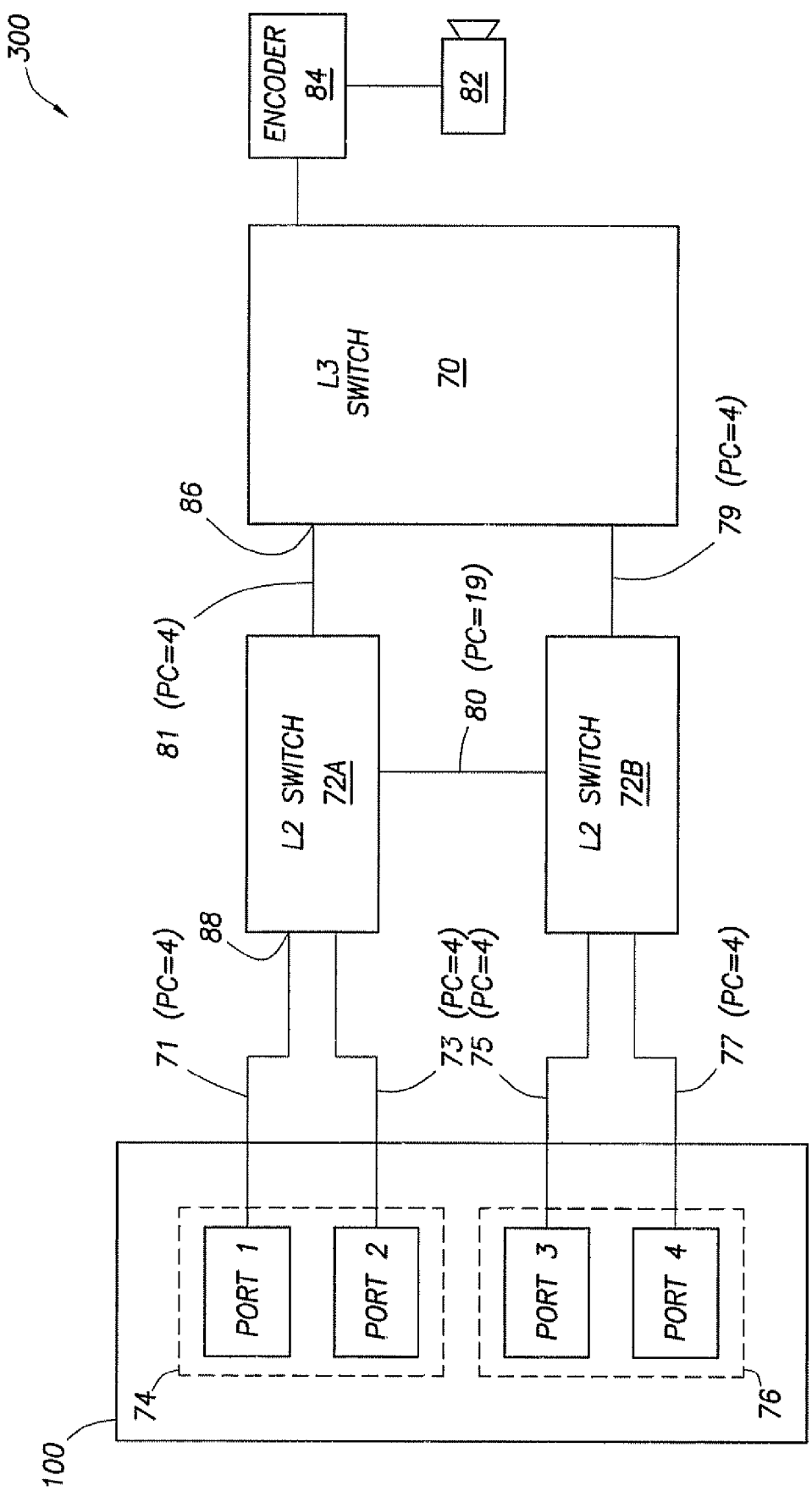
FIG. 3 illustrates a system in accordance with some embodiments.

FIG. 3 illustrates a system 300 implemented in accordance with at least some embodiments. In particular, FIG. 3 illustrates computer system 100 coupled to a protocol layer (layer 3) switch 70 of a network through two layer (layer 2) switch devices 72A and 72B. Of the four teamed ports of computer system 100, two ports couple to switch device 72A, and two ports couple to switch device 72B. FIG. 3 shows that ports 1 and 2 are implemented by a single NIC 74, while ports 3 and 4 are implemented by a single NIC 76, but this implementation is merely illustrative. The four ports may be implemented on a single NIC (but such an implementation would not provide NIC redundancy), may be implemented on four separate NICs, or any combination where four ports are available. For purpose of discussion, assume that ports 1-4 couple to their respective switch devices 72 by way of Gigabit connections 71, 73, 75 and 77 respectively. Likewise assume that each switch device 72 couples directly to the core switch 70 by way of a Gigabit connections 79 and 81. Finally assume that switch devices 72A and 72B couple to each other by way of a 100 Mbps connection 80.

FIG. 3 also shows a data streaming source, illustrated by a video camera 82 coupled to an encoder 84. A video camera is merely illustrative of possible streaming sources, and in alternative embodiments other streaming sources are used. Video camera 82 and encoder 84 produce streaming data that is supplied to the L3 switch 70. If no downstream devices have requested to receive the streaming data, the data "dies" at the L3 switch 70. Any number of downstream devices may request delivery of the streaming data, and thus the streaming data is alternatively and equivalently referred to a multicast data flow. One illustrative protocol a downstream device may use to join a multicast group, and therefore to receive the multicast data flow, is the protocol established by the Internet Group Management Protocol (IGMP), and in particular the IGMP join request.

Consider, for example, that an application program executing on computer system 100 wishes to join a multicast group to receive the multicast data flow from the camera 82 and encoder 84. The application program issues a multicast group join request, such as an IGMP join request, and the join request may propagate out port 1 to the L2 switch device 72A. The L2 switch device 72A in turn forwards the join request to the L3 switch device 70. In response, the L3 switch device 70 makes a notation in a table that a device coupled to its port 86 has joined the multicast group, and from that point forward the L3 device forwards the multicast data flow associate with the group (in this illustrative case the video from camera 82) out the port 86. Thus, the L3 switch device dynamically keeps track, on a port-by-port basis, of which port to send the multicast data flow associated with each multicast group, and sends such multicast data flow only out those ports.

The illustrative multicast data flow in the system of FIG. 3 is forwarded to the L2 switch device 72A. If the L2 switch device 72A is not configured to perform snooping of multicast join requests (discussed below), then the multicast data flow into the L2 switch device 72A flows out each and every port (except for the port on which the multicast data flow was received). Thus, in systems where L2 switch devices do not perform join requesting snooping, the multicast data flow is similar to broadcast traffic flow. L2 switch devices used in accordance with embodiments of the invention, however, implement snooping of multicast join requests, which for systems using IGMP may be referred to as IGMP snooping.

When a switch device performs join request snooping, the switch device monitors multicast group join requests flowing into each port, and makes a notation of such a join request. When multicast data flow for a particular group is provided to the switch device, rather than sending that multicast data out every port, the multicast data is sent only out the ports in which the multicast group join requests for the particular group was received. In the particular example where the multicast group join request originated from port 1 of the computer system 100, the L2 switch device 72A forwards multicast data flow from the group only to port 1. Of course, if another multicast group join request for the same group arrives at a second port, the multicast data flow for that group also flows out the second port. The characteristic associated with a switch performing multicast group join snooping holds true even in systems where a plurality of teamed ports couple to the same switch, and the characteristic is used to load balance multicast data flows.

Returning to FIG. 2, in accordance with some embodiments the intermediate driver 50 intercepts multicast group join requests from the illustrative TCP/IP stack 42. The TCP/IP stack 42 is unaware that the multiple communication ports are available, and thus always attempts to send multicast group join requests from the only port of which it is aware, a virtual port represented the team of ports. However, the intermediate driver 50 is aware of all the individual ports of the set of teamed ports, and redirects each multicast group join requests based on any of a variety of possible criteria.

Implementing a system such as that shown in FIG. 3 provides NIC redundancy within the computer system 100 and switch device redundancy. If all the ports are operational, all physical connections are operational, and both switch devices 72 are operational, each port of the set of teamed ports has identical connectivity to the L3 switch 70. In these situations, the intermediate driver 50 may perform a substantially even distribution or round-robin approach to selecting a port out which to send a multicast group join request (and thus through which port the multicast data flow will be received).

Selectively assigning ports of the set of teamed ports out which to send multicast group join requests in this manner thus implements receive load balancing of the multicast data flow. However, in some situations not all ports of a set of teamed ports have equivalent data throughput and/or have equivalent connectivity to the network (either initially, or because of network failures), and multicast data flow receive load balancing implemented in accordance with various embodiments takes into account these differences. In order to highlight differences in connectivity, and in particular differences in connectivity that arise because of network failures, attention now turns to FIG. 4.

Figure 4:
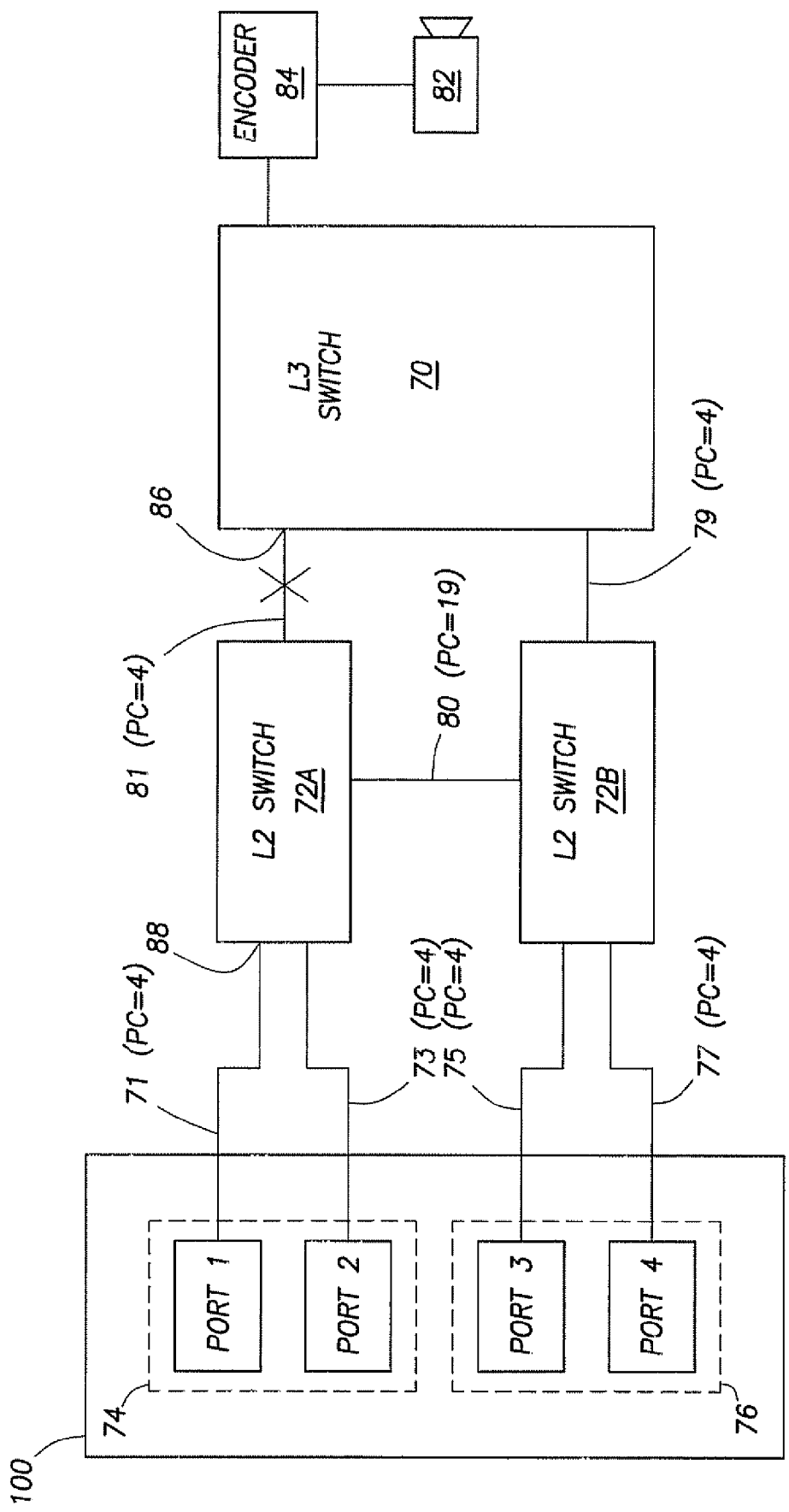
FIG. 4 illustrates a system as in FIG. 3, but with one failed uplink.

FIG. 4 illustrates a situation where the physical connection between the L2 switch device 72A and the core switch 70 is broken. By virtue of the 100 Mbps connection between the switch devices 72A and 72B, ports 1 and 2 will still have connectivity to the core switch 70, but the bandwidth will be severely restricted through the link 80. In this situation, an even distribution or round-robin approach to selecting ports out which to send multicast group join requests will result in assigning many multicast data flows to severely bandwidth limited ports. In order to address this difficulty, and in accordance with embodiments of the invention, assigning/reassigning ports out which to send multicast group join requests (and thus the ports on which the multicast data flow is received) by the intermediate driver 50 (of FIG. 2) takes into account connectivity of each port to the network. The explanation requires a brief digression into spanning tree data.

Information regarding the bandwidth of various connections between network devices on a network is often transmitted between contiguous switches on a network segment or subnet. The information is data defining a cost value for each connection in a path, the cost value being inversely related to the bandwidth of the connection (i.e., the cost value is lowest for those connections with the highest bandwidth and vice versa, but the cost value does not necessarily relate to a dollar value to use the connection). The cost of a path will be the cumulative cost for all of the connections in the path. For Ethernet networks, a standard for defining this information, and a protocol for transmitting the information between the switches, is known as Spanning Tree and is specified under the institute of electrical and electronics engineers (IEEE) 802.1D standard, as well as subsequent enhancements (such as, but not limited to, IEEE 802.1s and 802.1w).

In at least some embodiments, upon forming a team of ports the intermediate driver 50 establishes an address used to receive the Spanning Tree cost information in accordance with the 802.1D specification from the switches 72A and 72B. The cost information is transmitted in the form of data called Bridge Protocol Data Units (BPDU). The intermediate driver 50 extracts from the Spanning Tree frames the data defining the cost values for the paths to which its member ports are attached. Intermediate driver 50 then makes selection of a port out which to a multicast group join request, such as an IGMP join request, proportional to the cost data. The intermediate driver 50 continues to monitor the Spanning Tree data, and whenever the relative costs of the paths to which the team of ports are coupled changes the intermediate driver 50 likewise changes the distribution of new requests proportional to the cost data.

In FIG. 3, all four paths to the L3 switch 70 have equal cost. In the illustration of FIG. 3, ports 1-4 couple to the L2 switch devices 72 over Gigabit connections. Likewise, the uplinks between L2 switch devices 72 and the core switch 70 are also Gigabit. Each Gigabit connection may be assessed an equal cost value of port cost (PC)=4 by the Spanning Tree Protocol, which makes the cumulative cost of each path the same (i.e., path cost=8). The connection 80 between L2 switch devices 72 is in a standby mode when the uplinks to the L3 switch 70 are operational. Nevertheless, Spanning Tree assesses this 100 Mbps link a port cost=19, reflective of its significantly lower bandwidth.

In FIG. 4, a failure in the uplink between L2 switch device 72A and the core switch 70 activates link 80 (port cost=19) to maintain connectivity between switch device 72A and the L3 switch device 70. As a result, the new cumulative cost for ports 1 and 2 to reach the core switch goes from path cost=8 to path cost=27 (4+19+4), while the cost for ports 3 and 4 to reach the core switch remains at path cost=8. When the intermediate driver 50 becomes aware of a cost differential as between the ports, the selection of ports out which to send new multicast group join requests is proportional to the new cost distribution. In the case of using cost information contained with BPDU frames as the measure of cost, the number multicast data flows assigned to each port is inversely proportional to the BPDU data for that port (i.e., the lower the path cost value in the BPDU, the greater the number of clients assigned to the port).

The discussion of FIGS. 3 and 4 has assumed that each of the ports 14 are Gigabit ports, and that each physical connection supports Gigabit communications. In alternative embodiments, the ports 1-4 need not all be Gigabit ports, and instead one or more of the may have greater or lesser bandwidth (e.g., 100 Mbps).

Figure 5:
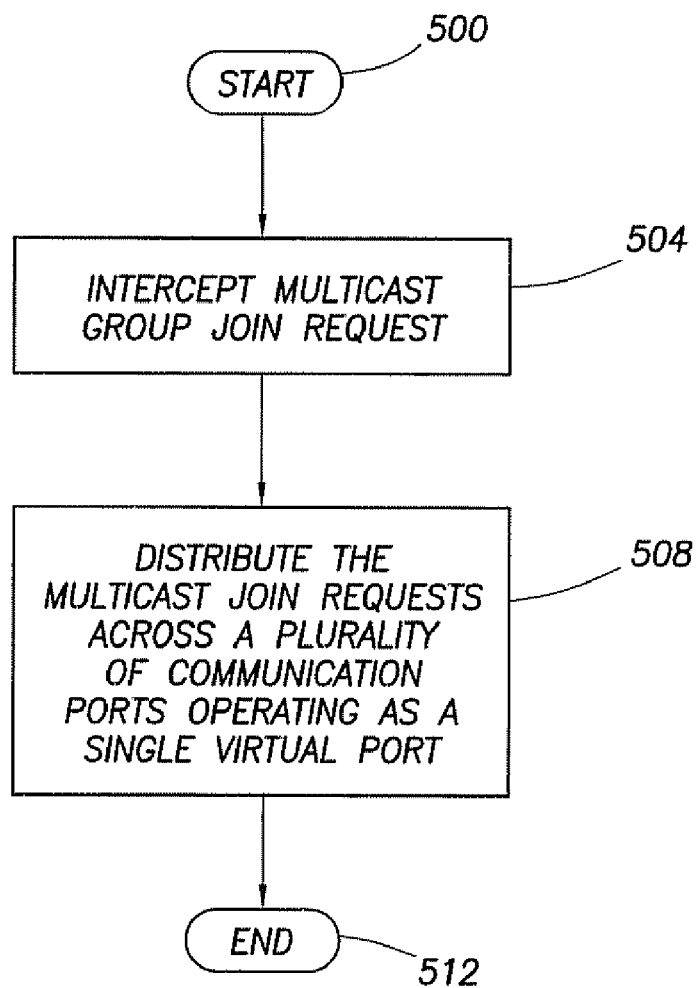
FIG. 5 illustrates a method in accordance with at least some embodiments.

FIG. 5 illustrates a method in accordance with at least some embodiments of the invention. In particular, the method starts (block 500) and proceeds to intercepting multicast group join requests (block 504). The intercepting may be by an intermediate driver 50 intercepting multicast group join requests sourced by a communication protocol stack (e.g., TCP/IP stack 42) in a computer system. Thereafter, the method proceeds to distributing the multicast join requests across a plurality of communication ports operating as a single communication port (block 508), and the process ends (block 512).

Distributing the multicast join requests could take many forms. In computer systems where each port of the teamed communication ports all have the same bandwidth or throughput capability, the distribution could be a substantially even or round-robin-style distribution. In systems where the bandwidth or throughput capability of each port of the teamed communication ports is different, the distribution of the multicast join requests (and therefore the flow of inbound multicast data flows) may be distributed proportional to each port's bandwidth or throughput capability. In systems where the switches to which a computer system couples transmit spanning tree data, the distribution of the multicast join requests may be based on the path cost data in the received BPDUs for each port, and more particularly inversely proportional to each port's path cost data in the received BPDU.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. For example, the various embodiments discuss use of a layer 2 switch device, performing IGMP snooping immediately upstream of the computer system 100, however, the various embodiments work equally well with a layer 3 device immediately upstream of the computer system. Moreover, the embodiments discussed with respect to FIG. 3 show the set of teamed ports split between two different upstream switch devices; however, the various embodiments work equally well with all the teamed ports coupled to a single upstream switch or router device. Further still, any type of path cost information may be used, such as duplex information, path delay values, number of link loss events on each port, and error statistics information. It is intended that the following claims be interpreted to embrace all such variations and modifications.

What is claimed is:

1. A method comprising:

sending a first multicast group join request from a first port of a set of teamed communication ports of a computer system, the first port coupled to a first switch device, the set of teamed communication ports appearing as a single communication port to a program on the computer system, and the first multicast group join request requests joining a first multicast group;

sending a second multicast group join request from a second port of the set of teamed communication ports, the second port coupled to a second switch device different than the first switch device, the second multicast group join request requests joining a second multicast group; and sending a third multicast group join request from one of the first or second ports selected to distribute multicast group join requests across the teamed communication ports proportional to the path cost information of each port, and wherein the third multicast group join request requests joining a third multicast group.

2. The method as defined in claim 1 wherein sending the first multicast group join request further comprises sending an Internet Group Management Protocol (IGMP) join request for the first multicast group.

3. The method as defined in claim 1 further comprising:

wherein sending the first multicast group join request further comprises sending the first multicast group join request from the first port being a port of a first network interface device; and wherein sending the second multicast group join request further comprises sending the first multicast group join request from the second port being a port of a second network interface device different than the first network interface device.

4. A method comprising:

sending a first multicast group join request from a first port of a set of teamed communication ports of a computer system, the first port coupled to a first switch device, the set of teamed communication ports appearing as a single communication port to a program on the computer system, and the first multicast group join request requests joining a first multicast group;

sending a second multicast group join request from a second port of the set of teamed communication ports, the second port coupled to a second switch device different than the first switch device, the second multicast group join request requests joining a second multicast group; and sending a third multicast group join request from one of the first or second ports selected such that the multicast join requests are distributed inversely proportional to each communication port's bridge protocol data unit (BPDU) data, and wherein the third multicast group join request requests joining a third multicast group.

5. The method as defined in claim 4 wherein sending the first multicast group join request further comprises sending an Internet Group Management Protocol (IGMP) join request for the first multicast group.

6. The method as defined in claim 4 further comprising:

wherein sending the first multicast group join request further comprises sending the first multicast group join request from the first port being a port of a first network interface device; and wherein sending the second multicast group join request further comprises sending the first multicast group join request from the second port being a port of a second network interface device different than the first network interface device.

7. A system comprising:

a computer system comprising:
   a processor;
   a main memory coupled to the processor; and
   a plurality of communication ports coupled to the processor, the communication ports teamed to appear as a single virtual port to a program executed on the processor;

a communication system comprising:
   a first switch device coupled directly to at least one of the plurality of communication ports; and
   a second switch device, different than the first switch device, the second switch device coupled directly to at least one of the plurality of communication ports;

wherein, for a plurality of multicast groups to be joined by the computer system, the processor is configured to send a first multicast join request to the first switch device, and to send a second multicast join request to the second switch device, and wherein the processor distributes the multicast join requests inversely proportional to each communication port's bridge protocol data unit (BPDU) data.

8. The system as defined in claim 7 wherein the plurality of communication ports comprises:

a communication port of a first network interface card (NIC), the first NIC coupled to the processor; and a communication port of a second NIC, different than the first NIC, the second NIC coupled to the processor.

9. A system comprising:

a computer system comprising:
   a processor;
   a main memory coupled to the processor; and
   a plurality of communication ports coupled to the processor, the communication ports teamed to appear as a single virtual port to a program executed on the processor;

a communication system comprising:
   a first switch device coupled directly to at least one of the plurality of communication ports; and
   a second switch device, different than the first switch device, the second switch device coupled directly to at least one of the plurality of communication ports;

wherein the communicative arrangement of the computer system to the switch devices is such that, when multicast packets are forwarded from the switch devices to the computer system, the computer system is the ultimate destination of the multicast packets forwarded; and wherein the computer system controls the communication ports across which the multicast packets are sent from the switch devices to the computer system, and wherein the computer system distributes the multicast packets across the communication ports inversely proportional to each communication port's bridge protocol data unit (BPDU) data.

10. The system as defined in claim 9 wherein when the computer system controls the communication ports across which the multicast packets flow, the computer system distributes the multicast packets across the communication ports based on the path cost information of each of the communication ports.

* * * * *

UNITED STATES PATENT AND TRADEMARK OFFICE
CERTIFICATE OF CORRECTION

| | | |
|---|---|---|
| PATENT NO. | : 7,813,286 B2 | Page 1 of 1 |
| APPLICATION NO. | : 11/468499 | |
| DATED | : October 12, 2010 | |
| INVENTOR(S) | : Mark C. Stratton et al. | |

It is certified that error appears in the above-identified patent and that said Letters Patent is hereby corrected as shown below:

On the Title page, in field (54), Title, in column 1, line 2, delete "REQUEST" and insert -- REQUESTS --, therefor.

In column 1, line 2, delete "REQUEST" and insert -- REQUESTS --, therefor.

Signed and Sealed this
Fifteenth Day of March, 2011

David J. Kappos
*Director of the United States Patent and Trademark Office*